United States Patent
Lu et al.

(10) Patent No.: US 9,189,796 B2
(45) Date of Patent: Nov. 17, 2015

(54) METHODS AND APPARATUS TO COLLECT BROADBAND MARKET DATA

(75) Inventors: Shi Lu, San Ramon, CA (US); Ranney Fry, Sausalito, CA (US); Jerome Baccelli, Berkeley, CA (US)

(73) Assignee: The Nielsen Company (US), LLC, New York, NY (US)

( * ) Notice: Subject to any disclaimer, the term of this patent is extended or adjusted under 35 U.S.C. 154(b) by 95 days.

(21) Appl. No.: 13/616,693

(22) Filed: Sep. 14, 2012

(65) Prior Publication Data

US 2013/0013770 A1    Jan. 10, 2013

Related U.S. Application Data

(63) Continuation of application No. 12/576,805, filed on Oct. 9, 2009, now Pat. No. 8,280,996.

(60) Provisional application No. 61/148,263, filed on Jan. 29, 2009.

(51) Int. Cl.
*H04L 29/08* (2006.01)
*G06Q 30/02* (2012.01)

(52) U.S. Cl.
CPC ............ *G06Q 30/02* (2013.01); *G06Q 30/0203* (2013.01); *H04L 67/16* (2013.01)

(58) Field of Classification Search
CPC ....................................... H04L 67/16
USPC ................................ 709/223, 224
See application file for complete search history.

(56) References Cited

U.S. PATENT DOCUMENTS

| | | | |
|---|---|---|---|
| 5,845,285 A | 12/1998 | Klein | |
| 6,151,631 A * | 11/2000 | Ansell et al. | 709/229 |
| 6,516,189 B1 | 2/2003 | Frangione et al. | |
| 6,684,250 B2 | 1/2004 | Anderson et al. | |
| 6,751,295 B2 | 6/2004 | McCulley et al. | |
| 7,200,658 B2 * | 4/2007 | Goeller et al. | 709/224 |
| 7,577,725 B1 * | 8/2009 | Sitaraman et al. | 709/221 |
| 7,818,201 B2 * | 10/2010 | Shevlin et al. | 705/7.13 |
| 8,280,996 B2 | 10/2012 | Lu et al. | |

(Continued)

FOREIGN PATENT DOCUMENTS

GB    2408114    5/2005

OTHER PUBLICATIONS

International Bureau, "International Preliminary Report on Patentability," issued in connection with international application serial No. PCT/US2010/022384, issued Aug. 2, 2011, 10 pages.

(Continued)

*Primary Examiner* — Asghar Bilgrami
(74) *Attorney, Agent, or Firm* — Hanley, Flight & Zimmerman, LLC

(57) ABSTRACT

Example methods and apparatus to collect broadband market data are disclosed. A disclosed example method includes selecting a panelist household, the panelist household subscribing to at least one broadband service delivered via a modem, and identifying an Internet protocol (IP) address assigned to the modem by an Internet service provider (ISP). The example method also includes retrieving a range of IP addresses associated with the ISP, selecting a random subset of IP addresses from the range of IP addresses, and testing each of the IP addresses from the random subset to determine an activity status of each IP address.

22 Claims, 10 Drawing Sheets

(56) References Cited

U.S. PATENT DOCUMENTS

| | | | |
|---|---|---|---|
| 2002/0052950 A1 | 5/2002 | Pillai et al. | |
| 2002/0143918 A1 | 10/2002 | Soles et al. | |
| 2002/0184533 A1 | 12/2002 | Fox | |
| 2003/0064722 A1 | 4/2003 | Frangione et al. | |
| 2003/0083924 A1 | 5/2003 | Lee et al. | |
| 2003/0093438 A1* | 5/2003 | Miller | 707/104.1 |
| 2003/0229534 A1 | 12/2003 | Frangione et al. | |
| 2004/0019518 A1 | 1/2004 | Abraham et al. | |
| 2004/0030605 A1 | 2/2004 | Ling | |
| 2004/0068582 A1 | 4/2004 | Anderson et al. | |
| 2004/0177276 A1 | 9/2004 | MacKinnon et al. | |
| 2004/0193918 A1* | 9/2004 | Green et al. | 713/201 |
| 2005/0096969 A1 | 5/2005 | Sevio | |
| 2005/0108378 A1 | 5/2005 | Patterson et al. | |
| 2006/0031385 A1* | 2/2006 | Westerdal | 709/217 |
| 2006/0106944 A1 | 5/2006 | Shahine et al. | |
| 2006/0130147 A1 | 6/2006 | Von-Maszewski | |
| 2006/0178903 A1 | 8/2006 | Cruz-Rivera | |
| 2006/0184381 A1 | 8/2006 | Rice et al. | |
| 2006/0212931 A1 | 9/2006 | Shull et al. | |
| 2008/0040777 A1 | 2/2008 | Aihara et al. | |
| 2008/0046569 A1 | 2/2008 | DePue et al. | |
| 2008/0065440 A1 | 3/2008 | Graham et al. | |
| 2008/0189408 A1 | 8/2008 | Cancel et al. | |
| 2008/0256235 A1 | 10/2008 | Or Sim et al. | |
| 2008/0281699 A1 | 11/2008 | Whitehead | |
| 2008/0313019 A1 | 12/2008 | Jeffers | |
| 2008/0320119 A1* | 12/2008 | Achan et al. | 709/222 |
| 2009/0070289 A1 | 3/2009 | Churi et al. | |
| 2009/0112918 A1 | 4/2009 | Terrell | |
| 2009/0132395 A1 | 5/2009 | Lam et al. | |
| 2009/0150166 A1 | 6/2009 | Leite et al. | |
| 2009/0197582 A1 | 8/2009 | Lewis et al. | |
| 2010/0191577 A1 | 7/2010 | Lu et al. | |
| 2010/0191723 A1 | 7/2010 | Perez et al. | |

OTHER PUBLICATIONS

International Bureau, "International Preliminary Report on Patentability," issued in connection with international application serial No. PCT/US2010/022387, issued Aug. 2, 2011, 9 pages.

International Searching Authority, "International Search Report," issued in connection with international application serial No. PCT/US2010/022384, mailed Jul. 23, 2010, 3 pages.

International Searching Authority, "Written Opinion of the International Searching Authority," issued in connection with international application serial No. PCT/US2010/022384, mailed Jul. 23, 2010, 7 pages.

International Searching Authority, "International Search Report," issued in connection with international application serial No. PCT/US2010/022387, mailed Jun. 29, 2010, 3 pages.

International Searching Authority, "Written Opinion of the International Searching Authority," issued in connection with international application serial No. PCT/US2010/022387, mailed Jun. 29, 2010, 7 pages.

Ruitenberg, Rudy, "Custom Internet Domain Suffixes Approved," washingtonpost.com, Jun. 27, 2008, 2 pages.

Crucial Paradigm, "How Reverse DNS Works (RDNS)," retrieved from www.crucialp.com on Jan. 6, 2009, 2 pages.

National Center for Health Statistics, "NCHS Guidelines for Ensuring the Quality of Information Disseminated to the Public," Jan. 11, 2007, 7 pages.

Audit My PC, "Port Scanning," retrieved from www.auditmypc.com on Jan. 5, 2009, 5 pages.

Japanese Patent Office, "Office Action," issued in connection with Japanese application serial No. P2011-548288, issued Jan. 29, 2013, 7 pages.

Australian Patent Office, "Examination Report," issued in connection with Australian application serial No. 2010208224, issued Aug. 31, 2012, 2 pages.

United States Patent and Trademark Office, "Notice of Allowance," issued in connection with U.S. Appl. No. 12/576,805, issued Jun. 4, 2012, 22 pages.

United States Patent and Trademark Office, "Non-Final Office Action," issued in connection with U.S. Appl. No. 12/576,805, issued Jun. 29, 2011, 33 pages.

Australian Patent Office, "Examination Report," issued in connection with Australian application serial No. 2010208227, issued Feb. 28, 2013, 3 pages.

Japanese Patent Office, "Office Action," issued in connection with Japanese application serial No. P2011-548290, issued Jan. 29, 2013, 6 pages.

United States Patent and Trademark Office, "Non-Final Office Action," issued in connection with U.S. Appl. No. 12/695,793, issued Feb. 15, 2013, 45 pages.

IP Australia, "Patent Examination Report No. 1," issued in connection with corresponding Australian Patent Application No. 2013203834, mailed Oct. 2, 2014 (3 pages).

European Patent Office, "Extended European Search Report," issued in connection with European Patent Application No. 10702966.2, Feb. 28, 2014 (7 pages).

United States Patent and Trademark Office, "Non-Final Office Action," issued in connection with U.S. Appl. No. 12/695,793, Aug. 30, 2013 (17 pages).

United States Patent and Trademark Office, "Final Office Action," in connection with U.S. Appl. No. 12/695,793, Apr. 24, 2014 (19 pages).

European Patent Office, "Extended European Search Report," issued in connection with European Patent Application No. 10702967.0, Sep. 9, 2013 (8 pages).

Intellectual Property Office of Great Britain , "Examination Report," issued in connection with Application No. GB1113769.2, Mar. 24, 2014 (5 pages).

European Patent Office, "Supplementary European Search Report," issued in connection with European Patent Application No. 10702966.2, mailed Mar. 18, 2014 (1 page).

European Patent Office, "Supplementary European Search Report," issued in connection with European Patent Application No. 10702967.0, mailed Sep. 26, 2013 (1 page).

Intellectual Property Office of Great Britain, "Examination Report," issued in connection with British Application No. GB1113767.6, mailed Jun. 13, 2013 (4 pages).

IP Australia, "Notice of Acceptance," issued in connection with Australian Application No. 2010208227, mailed Jun. 2, 2014 (2 pages).

United States Patent and Trademark Office, "Non-Final Office Action," issued in connection with U.S. Appl. No. 12/695,793, mailed Jun. 22, 2012 (11 pages).

United States Patent and Trademark Office, "Advisory Action," issued in connection with U.S. Appl. No. 12/695,793, mailed Sep. 8, 2014 (3 pages).

* cited by examiner

METHODS AND APPARATUS TO COLLECT BROADBAND MARKET DATA

RELATED APPLICATION

This patent is a continuation and claims priority to U.S. application Ser. No. 12/576,805, filed Oct. 9, 2009, entitled "Methods and Apparatus to Collect Broadband Market Data," which claims the benefit of U.S. Provisional application Ser. No. 61/148,263, filed on Jan. 29, 2009, both of which are hereby incorporated by reference herein in their entireties.

FIELD OF THE DISCLOSURE

This disclosure relates generally to market research and, more particularly, to methods and apparatus to collect broadband market data.

BACKGROUND

Internet service providers (ISPs) that choose to participate in a market typically need to acquire information about their competitors. Competitive information allows the ISP to employ strategic and/or tactical decisions related to opportunities that may increase a subscriber base and/or identify which market areas may be particularly receptive to the services provided by the ISP. Additionally, information about the ISP and its competitors permits a comparison to reveal market presence and/or market dominance.

Obtaining information related to the presence of competitive ISPs and/or the market share in any particular geographic market may entail conducting surveys. Surveys, whether oral or written, typically yield low sample rates when compared to the total number of existing subscribers. Additionally, answers to the surveys are usually provided by a human respondent, who is prone to inaccuracy regarding details of their existing ISP. For example, a human respondent may state the name of their browser application or computer manufacturer instead of the name of their ISP.

Additionally, because oral and written surveys are perceived as a burden to subscribers, ISPs are not likely to enjoy opportunities to determine whether the subscriber's status has changed. For example, a subscriber to an ISP is not typically bound by contracts that restrict and/or discourage competitive shopping with alternate ISPs. Thus, if the subscriber agrees to answer survey questions at a first time, such subscriber is not likely to also agree to another survey question at a second time (e.g., two-months after the first survey). Instead, the subscriber is likely to view the additional survey questions as a burden not worthy of their time.

DETAILED DESCRIPTION

Figure 1:
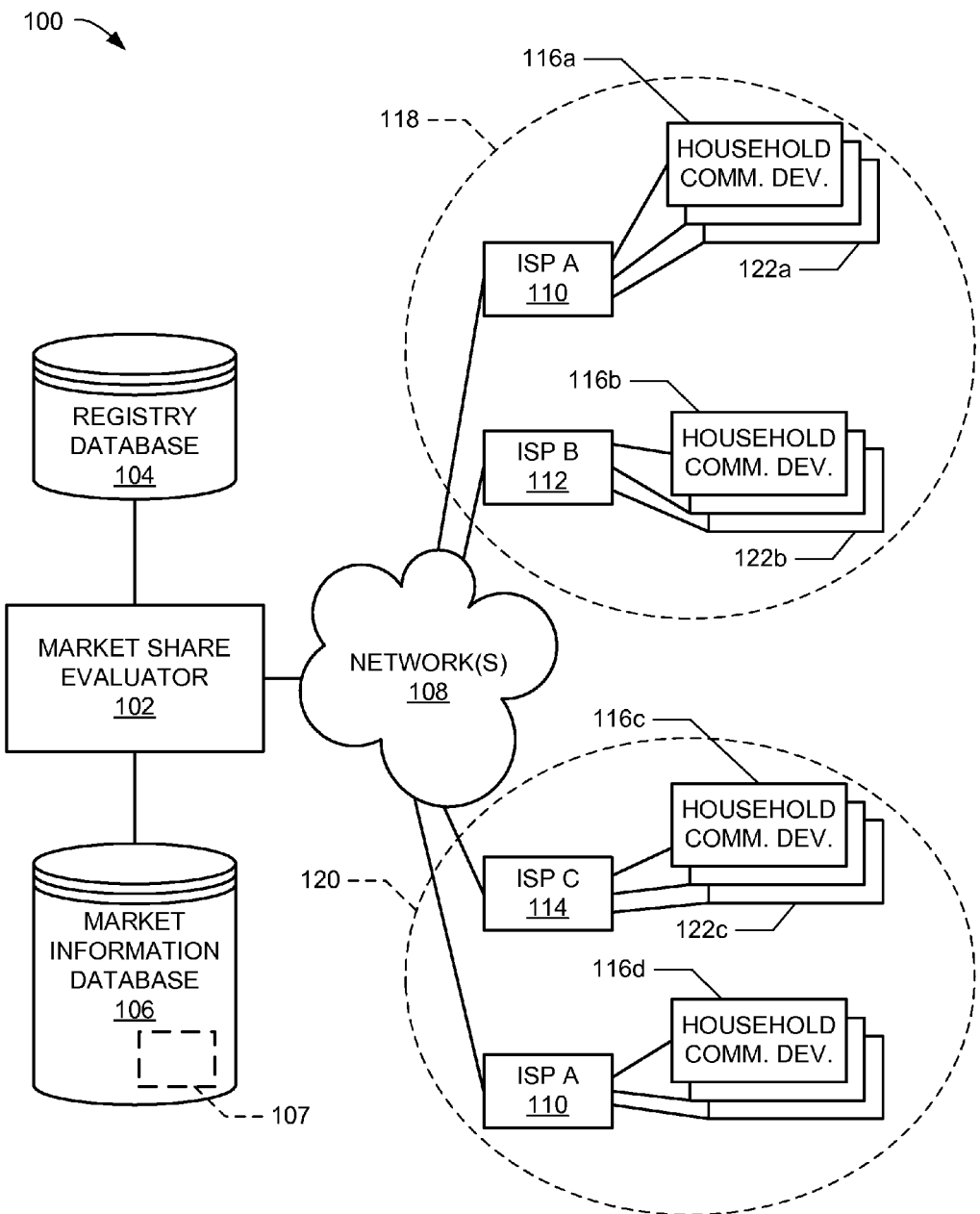
FIG. 1 is a block diagram of an example system to collect broadband market data.

Although the following discloses example methods and apparatus including, among other components, software executed on hardware, such methods and apparatus are merely illustrative and should not be considered as limiting. For example, any or all of these hardware and software components could be embodied exclusively in hardware, exclusively in software, or in any combination of hardware and software. Accordingly, while the following describes example methods, systems, and apparatus, the examples provided are not the only way to implement such methods, systems, and apparatus.

Example methods and apparatus to collect broadband market data are disclosed. A disclosed example method includes selecting a panelist household, the panelist household subscribing to at least one broadband service delivered via a modem, and identifying an Internet protocol (IP) address assigned to the modem by an Internet service provider (ISP). The example method also includes retrieving a range of IP addresses associated with the ISP, selecting a random subset of IP addresses from the range of IP addresses, and testing each of the IP addresses from the random subset to determine an activity status of each IP address.

A disclosed example apparatus includes a test manager to select a panelist household and identify an IP address assigned to a household modem, a registry manager to retrieve a range of IP addresses registered by an ISP, the identified IP address within the retrieved range of IP addresses, and an activity determiner to identify whether each IP address in the range of IP addresses is active or inactive.

In the event that an internet service provider (ISP) gains or loses subscribers, the ISP is particularly interested in learning whether competitors experience a similar gain or loss. For example, if the ISP and one or more competitors experience similar gains in subscribers, then the general market area may be experiencing growth. Such an indication may prompt the ISP to increase advertising and/or promotional resources to attempt to capture such growth (e.g., market share) opportunities before one or more competitors capture a greater portion of the available subscribers. Alternatively, if the ISP and one or more competitors experience subscriber losses, then the general market area may be stagnant and/or shrinking, which may indicate advertising and/or promotional efforts should focus on one or more alternate markets. On the other hand, in the event that the ISP market share is higher than one or more competitors and/or rate of new subscribers is increasing as compared to one or more competitors, then the ISP may gain insight to the effectiveness of an advertising campaign and/or a promotion.

The methods and apparatus described herein identify, in part, candidate internes protocol (IP) addresses that may be associated with subscribers, whether the IP addresses are active or inactive, the ISP associated with each IP address, and/or the location of the IP address. As described in further detail below, the methods and apparatus described herein allow a user to collect broadband market data for one or more market(s) of interest. As such, the user is better able to calculate market share for one or more broadband ISPs because, in part, market statistic calculation confidence increases when a statistically significant amount of data is available. An example market share database is updated on a scheduled basis, a manual basis, periodically, or aperiodically to store known ISPs, name servers, and/or router nomenclature (e.g., ge-0-1-ubr01.warren.ma.boston.comcast.net) associated with ISPs and/or IP addresses. In particular, the example methods and apparatus described herein identify one or more key words, letters, numbers, labels, and/or combinations thereof that may be indicative of geography (e.g., "ma," "boston," etc.) and/or one or more markets of interest.

FIG. 1 is an illustration of an example system 100 to collect broadband market data. In the illustrated example of FIG. 1, the system 100 includes a market share evaluator 102 communicatively connected to a registry database 104 and a market information database 106. The example registry database 104 may include one or more databases that identify which registrant is associated with one or more registered IP addresses and/or domain names. Such registry databases 104 include, but are not limited to, information from the American Registry for Internet Numbers (ARIN), the Internet Corporation for Assigned Names and Number (ICANN), IP Geolocation by Maxmind®, etc. Additionally, the example market information database 106 includes resolution keywords in an example resolution keyword table 107 to, in part, allow resolution of one or more hostname labels that may be cryptic and/or otherwise unfamiliar to a user of the methods and apparatus described herein. For example, in response to an example Whois query to ARIN, one or more labels may be returned having no apparent relationship to a state, a city, and/or a known ISP name. Accordingly, the example resolution keywords 107 may be used to decipher such labels.

The example market share evaluator 102 is also communicatively connected to one or more networks 108, such as the Internet. Any number of ISPs, such as example ISP "A" 110, ISP "B" 112, and ISP "C" are communicatively connected to the network 108, in which each ISP provides one or more services to household communication devices 116a-d. Household communication devices 116a-d may include, but are not limited to routers, modems and/or other equipment communicatively connected to an ISP. Each example ISP may be responsible for providing services (e.g., such as household Internet access, telephony, and/or media services) in an identified geographic market area. In the illustrated example of FIG. 1, ISP "A" 110 provides services to one or more household communication devices 116a, and ISP "B" 112 provides services to one or more household communication devices 116b, both of which are located in an example first market area 118. On the other hand, example ISP "C" 114 provides services to one or more household communication devices 116c in an example second market area 120.

In the illustrated example of FIG. 1, ISP "A" 110 provides services to one or more household communication devices in both the first market area 118 and the second market area 120. As described in further detail below, each household communication device is assigned an IP address (e.g., a static IP address or a dynamic IP address) by the ISP that is registered for use and/or management by that ISP. In the event that the ISP of interest has a presence in more than one market area (e.g., only the first market area 118, only the second market area 120, etc.), then the methods and apparatus described herein perform one or more techniques to ascertain the most likely geographic indicator (e.g., a state, a city, etc.) for the IP address assigned to the household communication device(s). For example, if one of the example household communication devices 116a has an IP address of 208.180.36.166, and one of the example household communication devices 116d has an IP address of 208.180.250.75, both of which are registered by ISP "A" 110, then the methods and apparatus described herein associate each IP address with a corresponding ISP router that provides geographic location cues. In particular, the methods and apparatus described herein may identify that the last router hop in the communicative path to IP address to 208.180.36.166 is associated with hostname s208-180-36-166.snjs.ca.sta.suddenlink.net," which includes one or more geographic location cues (e.g., "snjs" refers to San Jose).

Without limitation, the methods and apparatus described herein test one or more IP addresses to determine whether the IP address of interest is active or inactive. Generally speaking, an ISP registers one or more blocks of IP addresses that may be assigned to subscribers. ARIN is one of five Regional Internet Registries (RIRs) that manage IP address resources. Other RIRs include the Asia Pacific Network Information Centre (APNIC) and the Latin American and Caribbean IP Address Regional Registry (LACNIC). ARIN facilitates one or more processes that allow a user (e.g., an ISP) to register (usually for a fee) one or more IP addresses for exclusive use and to associate the registered IP address with a hostname. ARIN also facilitates a database lookup facility to allow queries (e.g., Whois queries) of an IP address to return a corresponding hostname, organization information, and/or whether the organization has other registered IP addresses (e.g., a block of IP addresses). However, while the organization information may include a corresponding contact name and/or address, such organization information may not be indicative of where the registered IP address(es) are being used (located). To illustrate, the IP address 68.87.148.146 is associated with, at the time of this writing, Comcast Cable Communications, Inc. having an organization address in Mt. Laurel, N.J. The ARIN database also indicates that this organization has registered a block of IP addresses ranging from 68.80.0.0 to 68.87.255.255. However, a User Datagram Protocol (UDP) and/or an Internet Control Message Protocol (ICMP) trace-route of the IP address 68.87.148.146 reveals that the last router hostname is "ge-0-1-ubr01.warren.ma.boston.comcast.net." As described above, the labels within the example hostname provide at least two geographic cues (i.e., "ma," and "boston") of where the IP address of interest is likely being used. In this example, the most likely geographic location associated with the IP address 68.87.148.146 is Boston, Mass.

While the concept of a hostname is to, in part, facilitate a human-readable association with a specific IP address, the hostname and/or one or more labels of the hostname concatenated with dots may still appear cryptic to a human attempting to read it. For example, labels within the example hostname "snjs.ca.sta.suddenlink.net" may not readily appear to reveal useful information to persons unfamiliar with the San Jose area. Alternatively, users may confuse the label "ca" with nomenclature associated with Canada rather than California. To better resolve hostname labels and determine geographic and/or organizational association(s), the methods and apparatus described herein parse the hostname labels and search the example market information database 106 for matching (e.g., logical ANDed) combinations. In the event that a match of two or more labels is found after a logical AND, a candidate geographic location and/or associated organization associated with the IP address may be determined. To illustrate with the above-identified example hostname "snjs.ca.sta.suddenlink.net," the methods and apparatus described herein search for a combination of labels "snjs," "ca," and "suddenlink" before concluding that the router hostname is properly associated with the organization Suddenlink Communications, Inc. located in San Jose, Calif.

Returning to the illustrated example of FIG. 1, one or more household communication devices may be associated with one or more panelists, such as panelist router "A" 122a, panelist router "B" 122b, and panelist router "C" 122c. One or more panelist households may be selected by, for example, a marketing entity to obtain a statistically significant sample size of behavior so that projections to a larger universe may be made with an acceptable degree of confidence. Panelists are typically selected in sufficient numbers to achieve statistical significance, and represent one or more particular geographic and/or demographic aspects of a larger universe of participants (e.g., subscribers of Internet services, viewers of media devices, Hispanic consumers, Japanese consumers, etc.). One or more households typically become a representative panelist based on, in part, an agreement with the monitoring entity (e.g., the marketing entity) to have one or more household behaviors monitored. Household behaviors of interest to the monitoring entity include, but are not limited to, television programs watched, dates/times at which programs are watched, shopping behaviors, web sites visited, and/or household services purchased (e.g., Internet services, telephony services, etc.). The agreement with the household panelists also includes explicit information related to the household address, thereby revealing their location. In the illustrated example of FIG. 1, the panelists 122a-c also provide information related to the IP address assigned to their router(s) and the ISP with which the household subscribes.

As described in further detail below, the example market share evaluator 102 periodically, aperiodically, manually, or on a scheduled basis retrieves updates from the panelist households 122a-c to obtain the most recent IP address and ISP used by that household. For example, each panelist household may have one or more personal computers running one or more applications that determine the assigned router IP address and e-mail such IP address information back to the marketing entity. In the event that a household decides to change which ISP supplies Internet services, the example market share evaluator 102 updates the example market information database 106 with information related to the new and/or alternate ISP. In this manner, the system 100 may stay appraised of additional ISPs that enter the first market area 118 and/or the second market area 120. Additionally, the example market share evaluator 102 identifies one or more new and/or alternate hostname labels indicative of the new and/or alternate ISP. As a result, hostname resolution related to IP address location and its associated organization (e.g., its associated ISP) can be performed using the proper label(s).

Figure 2:
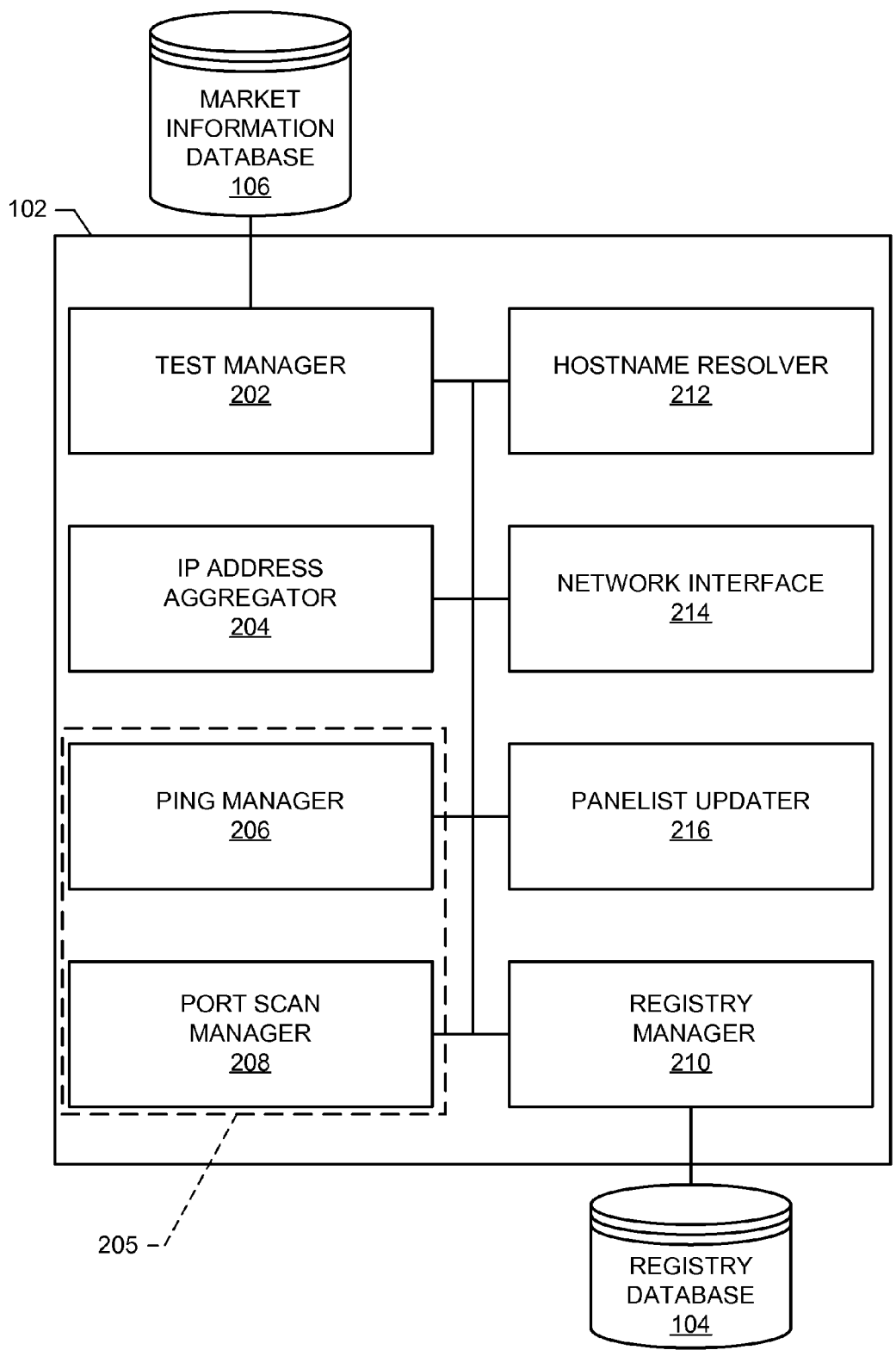
FIG. 2 is a block diagram of an example market share evaluator shown in FIG. 1.

FIG. 2 is a detailed schematic illustration of the example market share evaluator 102 shown in FIG. 1. The example market share evaluator 102 includes a test manager 202, an IP address aggregator 204, and an activity determiner 205 that includes an example ping manager 206, and a port scan manager 208. The example market share evaluator 102 also includes a registry manager 210 that is communicatively connected to the example registry database 104. Further, the example market share evaluator 102 includes a hostname resolver 212, a network interface 214 communicatively connected to the example network 108 (e.g., the Internet), and a panelist updater 216. The example test manager 202 is communicatively connected to the market information database 106 the IP address aggregator 204, the ping manager 206, the port scan manager 208, the registry manager 210, the hostname resolver 212, the network interface 214, and the panelist updater 216 to invoke one or more services thereof. The example test manager 202, on a periodic, scheduled, aperiodic, and/or manual basis invokes a test of one or more IP addresses to determine whether it is active or inactive. Additionally, the example test manager 202 determines a corresponding organization and location associated with the IP address. Once information related to an IP address active/inactive status, an organization, and a location is obtained, the example test manager 202 calculates market share statistics for each organization that provides Internet services to subscribers.

In operation, the example test manager 202 invokes the example IP address aggregator 204 to obtain one or more IP addresses of interest when performing a test. For example, the IP address aggregator 204 may provide one or more IP addresses of interest from the market information database 106, which may store IP addresses identified from one or more previous tests to determine an active/inactive state. As such, the data within the example market information database 106 may be kept current. Without limitation, the example IP address aggregator 204 selects one or more IP addresses of one or more panelist households 122a-c. Additionally, the IP address aggregator 204 may select one or more neighboring IP addresses that could be part of a block of IP addresses registered by the ISP associated with the panelist. The IP address aggregator 204 may also invoke the registry manager 210 to obtain one or more IP addresses associated with a specific organization/ISP. For example, the IP address aggregator 204 may specify an organization name "WOW MEDIA" to determine which IP addresses and/or blocks of IP addresses are registered by the organization/ISP of interest. In operation, the example registry manager 210 contacts at least one registry database, such as ARIN, and provides organizational name keywords as input to the registry database. In response to the query, the example registry manager 210 receives corresponding IP addresses, a seed starting IP address, and/or blocks of IP addresses associated with the keyword input(s). Rather than test all of the returned IP addresses identified from the registry database query, the example test manager 202 may randomly select a predetermined number of IP addresses from the block (e.g., a subset of the block) to test. As such, a representative random sample of IP addresses may provide a reasonable indication of market presence of the organization. Additionally or alternatively, the example test manager 202 may employ the seed starting IP address as a randomly selected IP address within the range associated with the organization. The randomly selected seed starting IP address may service as a starting IP address, an ending IP address, and/or a midpoint IP address within a range of IP addresses to test.

To determine whether an IP address of interest is active, the example ping manager 206 performs an ICMP Ping operation via the example network interface 214 using the IP address of interest. Generally speaking, a ping is a computer network tool employed to determine whether a host is reachable across a network and sends ICMP echo request packets to the target IP address of interest. After sending each echo request packet, the example ping manager 206 listens via the network interface 214 for ICMP echo response reply messages. If such reply messages are received, then the IP address of interest is deemed active. In some instances, an ISP and/or one or more routers in the path may block a ping request (e.g., for security concerns), at which point the example port scan manager 208 attempts to scan one or more ports (e.g., TCP port 80 http service, TCP port 443 https service, etc.) of the machine associated with IP address of interest. A successful port scan results in the IP address of interest being deemed active. Generally speaking, some ISPs may block either or both of a port scan or ping. If neither the ping nor the port scan are successful, the IP address of interest is deemed inactive and the market information database 106 is updated accordingly.

IP addresses of interest having a successful ping or port scan are further associated with information obtained from one or more registry databases 104, such as the ARIN database that stores registry information for IP addresses in North America, Canada, the Caribbean, and the North Atlantic Islands. A query to the ARIN database is also referred to as a Whois query, which accepts the IP address or hostname as input and returns information including, but not limited to, an associated organization, a contact person(s), contact telephone number(s), a contact address, and/or contact e-mail address. The organizational information returned from the ARIN query is compared to the market information database 106 for a match that indicates whether the organization is a corporation, a university, or an ISP. If the IP address of interest is associated with an ISP, then it is also deemed to be used for residential purposes.

The methods and apparatus described herein further determine a corresponding location and more detailed ownership information. In other words, while the ARIN query described above identifies the organization that registered the IP address of interest, such organization may be a reseller of IP addresses rather than the ultimate user. As such, the example hostname resolver 212 of FIG. 2 performs a reverse domain name server (DNS) lookup (sometimes referred to as NSLookup (nameserver lookup)) on the IP address to identify one or more cues indicative of true ownership. For example, an ARIN database query on the IP address 64.236.16.20 identifies "AOL Transit Data Network" as the organization that has registered IP addresses ranging from 64.236.0.0 to 64.236.255.255. However, the ultimate party and/or end-user for the IP address 64.236.16.20 is more accurately determined based on a reverse DNS lookup (also referred to as a reverse resolve) performed by the example hostname resolver 212, which reveals a hostname of "www2.cnn.com." Accordingly, the example hostname resolver 212 parses the hostname, extracts "cnn" and confirms the true end-user as CNN if a label-match is found in the example market information database 106.

To determine a location associated with the IP address of interest, the example hostname resolver 212 performs a multi-location trace-route. Generally speaking, a trace-route is a computer network application to identify the routers traversed by packets in an IP network. The trace-route application identifies multiple hops of routers, starting with the router closest to the requestor and ending with the last router closest to the target IP address. Router identification during each hop includes, in part, a name for each router. Router hops may be influenced by, in part, one or more firewalls that cause alternate hop destinations. Typically, the last router listed is a series of router hops geographically closest to the device associated with the IP address of interest. Depending on the location of the requestor that is performing a trace-route test, one or more router hops may be different when compared to a requestor in a separate location. In both cases, the last router hop is usually the same, but in some instances the last router hop may identify a different router. Such alternate paths may occur in the example event where one or more router path(s) are down due to, for example, hardware failure(s), power failure(s), and/or localized weather interruptions.

To improve the confidence level that the last router hop is correct during the trace-route, the example hostname resolver 212 performs a multi-location trace-route, in which the originating trace-route test uses the same IP address of interest, but at separate originating locations. For example, a first trace-route for IP address 24.32.38.55 may originate in San Francisco, Calif., a second trace-route for the same IP address may originate in Dallas, Tex., and a third trace-route for the same IP address may originate in Lindbergh, Va. While all three of these originating locations will include one or more initial unique router hops, the ultimate path of test packets is expected to reach the same last hop router. If all trace-route tests identify the same last hop router information (e.g., s208-180-36-166.snjs.ca.sta.suddenlink.net), then the example hostname resolver 212 parses the labels of the hostname for cues indicative of location. Such cues (e.g., labels "snjs," "ca," and "suddenlink") are compared against those labels stored in the example market information database 106 to resolve, or otherwise translate cryptic abbreviations and/or codes that refer to an organization (e.g., an ISP), a city (e.g., "snjs"), a state (e.g., "ca," "ma," etc.), or any other geographic identifier. On the other hand, if not all of the separate originating locations ultimately yield the same last hop router, then the example hostname resolver 212 may employ a threshold test before parsing labels from the hostname for location cues. In other words, a lower degree of confidence that the last hop router is the actual IP address location occurs when fewer than all separate originating locations yield the same last hop router name.

After identifying whether the IP address of interest is active or inactive, and after identifying a corresponding IP address owner (e.g., a true end-user rather than just the organization named by the registry), and after identifying a corresponding location of the IP address of interest, the methods and apparatus described herein save such information to the example market information database 106 (e.g., as tabular information). Typically, one or more entities interested in measuring broadband market statistics prefer to obtain a sufficient amount of sample measurements before any calculated results will be deemed statistically significant. As such, the methods and apparatus described herein may test any number of IP addresses of interest before calculating a corresponding market share of active IP addresses for any given time period (e.g., calculated market share per day, per week, per bi-week, per month, etc.). For example, if the example market share evaluator 102 tests five-hundred IP addresses associated with a first ISP and five-hundred IP addresses associated with a second ISP, then the example test manager 202 calculates a corresponding percentage of active IP addresses for each of the first and second ISP. Such calculated percentages may occur, for example, on a weekly basis to determine a projected broadband market presence per geographic area and/or identify one or more trends of market share penetration for competing ISPs.

IP addresses previously identified as active and/or associated with an organization are saved to the example market information database 106 for subsequent testing at a later date/time. For example, subscribers to ISP services may leave the ISP for a competitor's ISP, thereby causing the previously active IP address to become inactive/dormant. Subsequent testing of that same IP address may reveal that the IP address remains dormant/inactive for a period of time, or is reallocated to another subscriber. Additionally, performing one or more subsequent tests on the previously identified IP address (es) may prevent and/or minimize the need for additional queries to the registry database(s), in which each query may be associated with an access fee.

While an example system 100 to collect broadband market data and an example market share evaluator 102 has been illustrated in FIGS. 1 and 2, one or more of the interfaces, data structures, elements, processes and/or devices illustrated in FIGS. 1 and 2 may be combined, divided, re-arranged, omitted, eliminated and/or implemented in any other way. Further, the example market share evaluator 102, the example test manager 202, the example IP address aggregator 204, the example ping manager 206, the example port scan manager 208, the example registry manager 210, the example hostname resolver 212, the example network interface 214, and/or the example panelist updater 216 of FIGS. 1 and 2 may be implemented by hardware, software, and/or firmware. Thus, for example, any of the example market share evaluator 102, the example test manager 202, the example IP address aggregator 204, the example ping manager 206, the example port scan manager 208, the example registry manager 210, the example hostname resolver 212, the example network interface 214, and/or the example panelist updater 216 may be implemented by one or more circuit(s) (ASIC(s)), programmable logic device(s) (PLD(s)), and/or field programmable logic device(s) (FPLD(s)), etc. When any of the appended claims are read to cover a purely software and/or firmware implementation, at least one of the example market share evaluator 102, the example test manager 202, the example IP address aggregator 204, the example ping manager 206, the example port scan manager 208, the example registry manager 210, the example hostname resolver 212, the example network interface 214, and/or the example panelist updater 216 are hereby expressly defined to include a tangible medium, such as a memory, a digital versatile disc (DVD), a compact disc (CD), etc. storing the firmware and/or software. Further still, a communication system may include interfaces, data structures, elements, processes, and/or devices instead of, or in addition to, those illustrated in FIGS. 1 and 2 and/or may include more than one of any or all of the illustrated interfaces, data structures, elements, processes and/or devices.

FIGS. 3-8 illustrate example processes that may be performed to implement the example market share evaluator 102 of FIGS. 1 and 2. The example processes of FIGS. 3-8 may be carried out by a processor, a controller, and/or any other suitable processing device. For instance, the example processes of FIGS. 3-8 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium that can be used to carry or store program code and/or instructions in the form of machine-readable instructions or data structures, and that can be accessed by a processor, a general-purpose or special-purpose computer, or other machine with a processor (e.g., the example processor platform P100 discussed below in connection with FIG. 10). Combinations of the above are also included within the scope of computer-readable media. Machine-readable instructions comprise, for example, instructions and/or data that cause a processor, a general-purpose computer, a special-purpose computer, or a special-purpose processing machine to implement one or more particular processes. Alternatively, some or all of the example processes of FIGS. 3-8 may be implemented using any combination(s) of ASIC(s), PLD(s), FPLD(s), discrete logic, hardware, firmware, etc. Also, one or more operations of the example processes of FIGS. 3-8 may instead be implemented manually or as any combination of any of the foregoing techniques, for example, any combination of firmware, software, discrete logic, and/or hardware. Further, many other methods of implementing the example operations of FIGS. 3-8 may be employed. For example, the order of execution of the blocks may be changed, and/or one or more of the blocks described may be changed, eliminated, subdivided, or combined. Additionally, any or all of the example processes of FIGS. 3-8 may be carried out sequentially and/or carried out in parallel by, for example, separate processing threads, processors, devices, discrete logic, circuits, etc.

Figure 3:
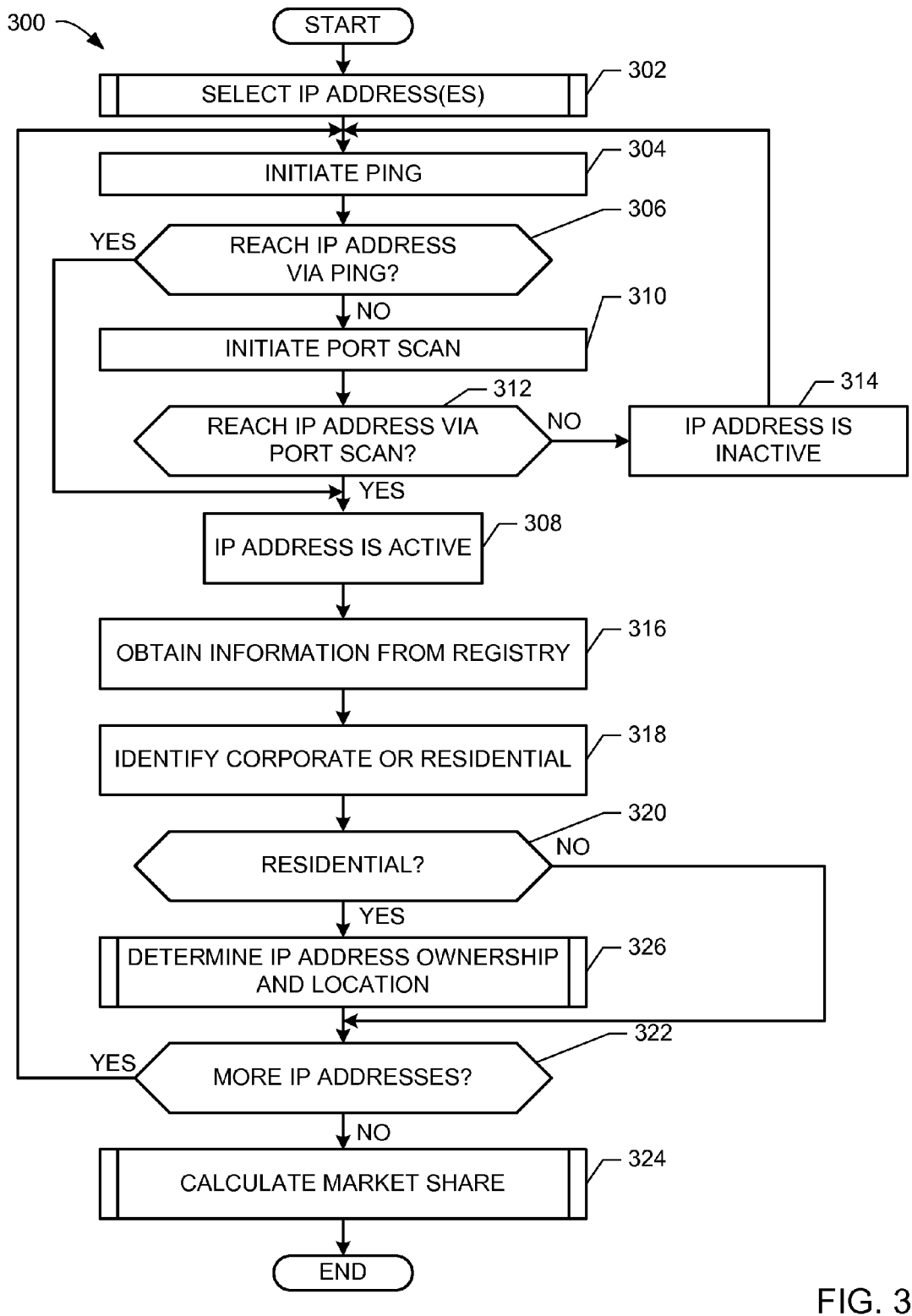
FIGS. 3-8 are flowcharts representative of examples processes that may be performed to implement one or more entities of the example systems and apparatus of FIGS. 1 and 2, and/or the example data charts of FIGS. 9A and 9B.

The example process 300 of FIG. 3 begins with the example test manager 202 selecting a candidate IP address to test (block 302). Candidate IP addresses may be retrieved from the example market information database 106 based on the IP address(es) associated with known panelists, and/or candidate IP address(es) may be acquired from the example registry database 104 in response to a query associated with an ISP of interest. For example, the example test manager 202 may query the registry database 104 (e.g., the ARIN database) using an organization name (e.g., Verizon) to determine whether the organization has registered one or more IP addresses and/or blocks of IP addresses (block 302).

Figure 4:
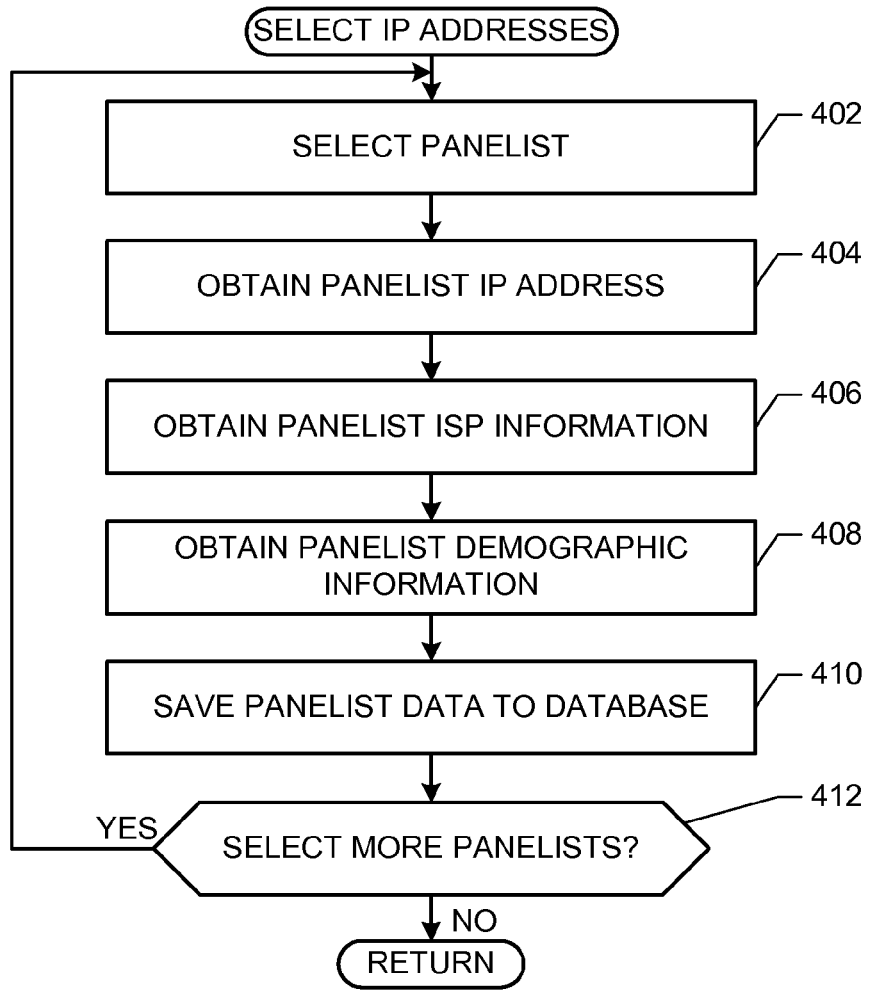

Turning briefly to the illustrated example process 400 of FIG. 4, the example test manager 202 may invoke the example panelist updater 216 to obtain panelist IP addresses to test and/or re-test. Generally speaking, because many ISPs assign IP addresses to subscribers in a dynamic manner rather than statically, such assigned IP addresses are subject to periodic expiration and reassignment. Accordingly, the one or more panelists may agree to disclose their current IP address, and/or otherwise allow home monitoring equipment to operate within the panelist household that periodically, manually, aperiodically, and/or on a scheduled basis report the current IP address. Without limitation, the home monitoring equipment may invoke an application (e.g., ipconfig) and/or script on one or more household personal computers to determine which IP address has been assigned to the panelist household.

In the illustrated example of FIG. 4, the example panelist updater 216 selects a panelist from the market information database 106 (block 402) and obtains the current IP address associated with that panelist (block 404). Additionally, the example panelist updater 216 may obtain, via survey and/or household monitoring device(s) (e.g., Nielsen® People Meter) other panelist ISP information (block 406). Panelist ISP information may include, but is not limited to, the ISP business name, the type of ISP services provided to the panelist household (e.g., DSL Internet services, cable Internet services, fiber optic services (FiOS), etc.). Without limitation, the example panelist updater 216 may obtain panelist demographic information from the example market information database 106, surveys, and/or the household monitoring device(s) (block 408). In the event that new and/or additional information is obtained via one or more surveys and/or via the household monitoring device(s) associated with, for example, Nielsen® online audience measurement services, such information is saved to the market information database 106 for future use (block 410). For example, one or more iterations through the illustrated example process 400 of FIG. 4 gathers additional candidate IP addresses for testing, as described in further detail below. IP addresses obtained through the one or more iterations may be saved to a memory and/or database for individual testing, which determines, in part, an active or inactive status of each candidate IP address. Accordingly, the example panelist updater 216 and/or the IP address aggregator 204 determines whether there are additional panelists to check (block 412) so that, in part, the example test manager 202 has a sufficient and/or statistically significant number of candidate IP addresses to make one or more market statistic conclusions having a requisite degree of confidence.

Figure 5:
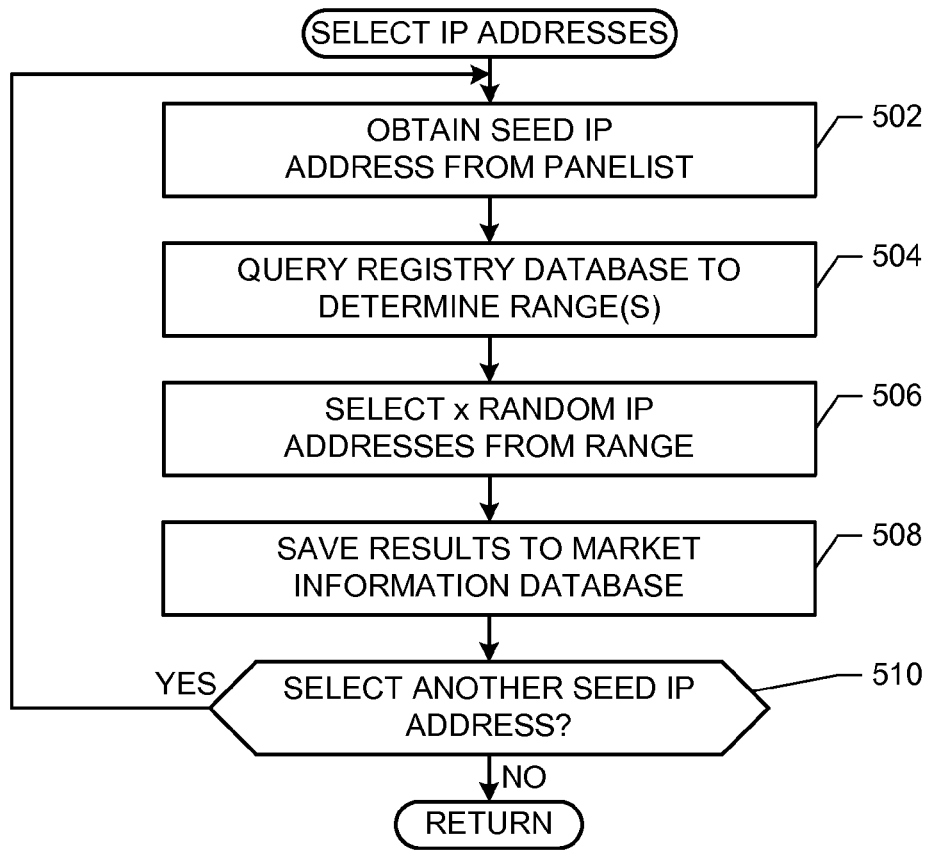

While the illustrated example process 400 of FIG. 4 obtains one or more candidate IP addresses for testing from panelists, the illustrated example process 500 of FIG. 5 also obtains candidate IP addresses for testing by determining whether the IP address registrant also manages one or more blocks of neighboring IP addresses. The example panelist updater 216 obtains a seed IP address from a panelist by querying the list of panelists stored in the example market information database 106 (block 502). Using the seed IP address as input for a query to the registry database 104, such as the ARIN database, the example registry manager 210 obtains information to indicate whether the seed IP address has one or more neighboring IP addresses also managed and/or registered by the same organizational entity (block 504). For example, a query to the ARIN database using a panelist seed IP address of 69.47.21.141 reveals, in part, an organization name "WideOpenWest Finance LLC," which has registered IP addresses ranging from 69.47.0.0 through 69.47.255.255. Based on this discovered range of IP addresses registered by the same organization, the example test manager 202 selects a random number of IP addresses to test (block 506). The selected random IP addresses may be temporarily saved by the test manager 202 in a queue or memory, and the information related to the known range of registered IP addresses for the organization are saved in the example market information database 106 (block 508) for future use. In other words, rather than perform another query to one or more registry databases 104 to determine a range of IP addresses registered by "WideOpenWest Finance LLC," the test manager 202 may, instead, select another group of random IP addresses to test from the market information database 106. If another seed IP address is to be selected (block 510) to, for example, acquire a greater number of IP addresses to satisfy a statistically significant threshold, control returns to block 502. Additionally, after saving the results to the example market information database 106 (block 508), a subsequent attempt to obtain an IP address to test by the market share evaluator 102 may not require any further queries to one or more registry databases 104. Instead, the example test manager 202 may acquire candidate IP addresses directly from the market information database 106, which are identified as being associated with a specific ISP.

Returning to the illustrated example process 300 of FIG. 3, after any number of IP addresses are selected (block 302), the example ping manager 206 performs a ping operation using one of the selected candidate IP addresses (block 304) to determine whether echo response messages are received and, if so (block 306) the selected candidate IP address is deemed active (block 308). In other words, the example ping manager 206 determines an activity status of the candidate IP address of interest. On the other hand, if the ping operation does not successfully return one or more echo response messages (block 306), the example test manager 202 directs the port scan manager 208 to initiate a port scan (block 310) and, if successful (block 312), the selected IP address is deemed active (block 308). However, if the port scan is not successful (block 312), the selected IP address is deemed inactive (block 314) and control returns to block 304 to select another candidate IP address to test.

IP addresses that are deemed active (block 308) by either a ping or port scan are further used as input for a query to one or more registry databases 104 (block 316), such as the ARIN database. Information retrieved from the registry databases 104 may include, but is not limited to, the name and/or address of the organization that registered the selected IP address, whether the named organization has also registered other IP addresses and/or one or more blocks of IP addresses, and/or a contact name, telephone number, and/or e-mail address of a contact responsible for the IP address. IP addresses that are associated with corporations, hospitals, schools, universities, and/or similar businesses and/or organizations are distinguished from IP addresses associated with residential use by the example market share evaluator 102 (block 318).

In particular, the example registry manager 210 compares the returned organization name with identified organization names stored in the market information database 106. The example market information database 106 includes at least one parameter associated with organization names to identify whether the organization is residential, meaning it provides IP addresses for residential purposes, or whether the organization is non-residential, meaning that it provides and/or otherwise manages IP addresses for corporate, scholastic, and/or any other non-residential purpose (block 318). If the IP address is not residential (block 320), then the example test manager 202 determines whether there are additional IP addresses of interest to test (block 322) and, if so, control returns to block 302. Otherwise, if the example test manager 202 determines that there are no additional IP addresses of interest to test, market share statistics are calculated based on the acquired test results (block 324), as described in further detail below.

In the event that the IP address is deemed residential (block 320), the example market share evaluator 102 determines a corresponding location of the IP address and performs a secondary test to identify a true end user (block 326) as compared to the registrant identified by one or more registry databases (e.g., the organization associated with OrgName by the ARIN database). As described above, the organization identified as responsible for a registered IP address may not be the ultimate end-user, but rather a reseller of IP addresses.

Figure 6:
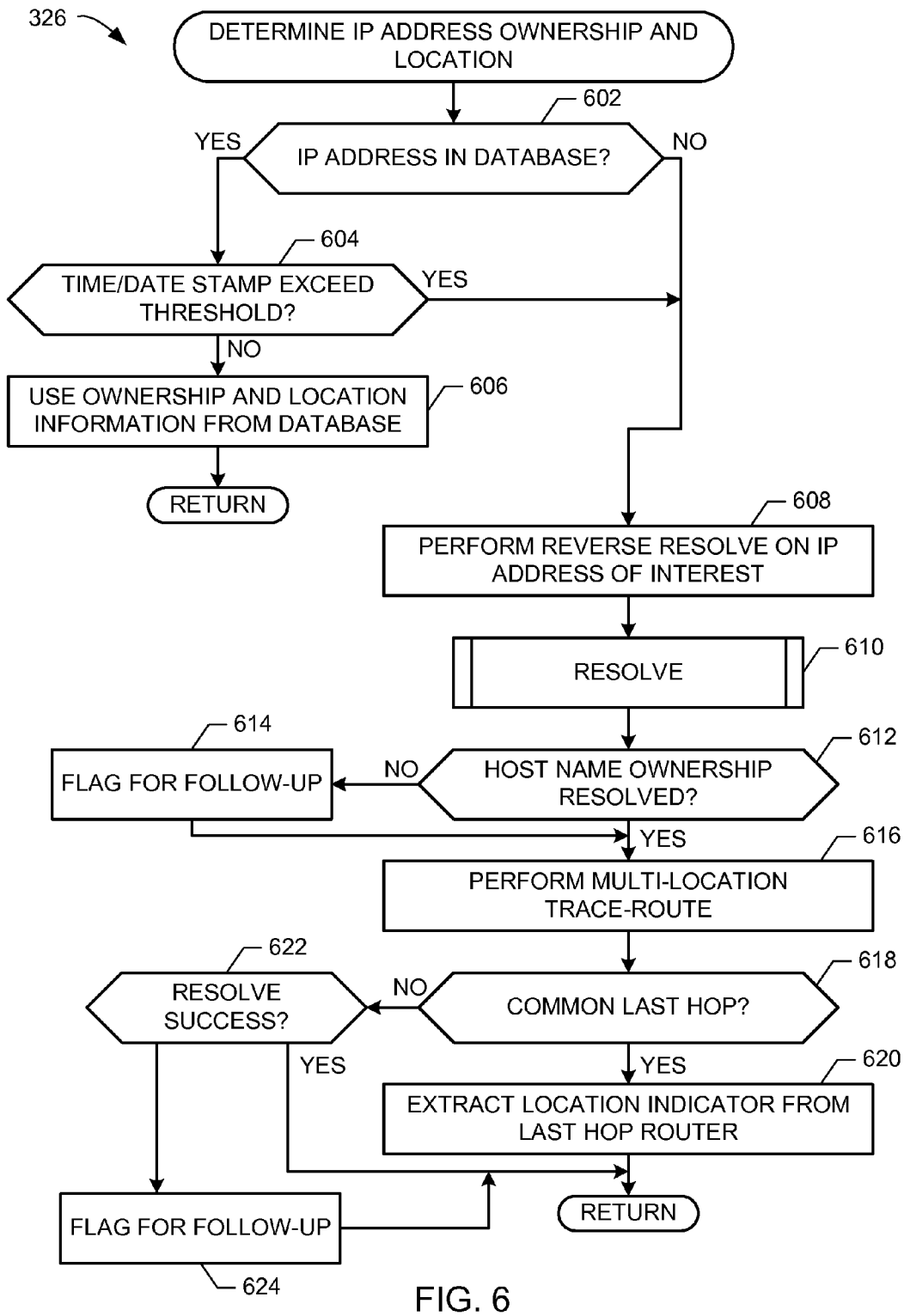

FIG. 6 illustrates the example process 326 to determine a corresponding location of the IP address and perform the secondary test to identify the true end user. In the illustrated example of FIG. 6, the example test manager 202 determines if the IP address of interest is stored in the example market information database 106 (block 602). If so, then the example market share evaluator 102 may not need to expend additional processing resources and/or time to determine true ownership and location information in the event that the stored information is relatively recent. As such, the example test manager 202 determines whether the information associated with the IP address of interest exceeds a date and/or time threshold, which serves as an indication of how recent or current the stored information is. If the threshold is not exceeded (block 604), thereby indicating that the IP address information stored in the example market information database 106 is relatively recent or current, such stored information is relied upon to confirm the true owner and location of the IP address of interest (block 606).

On the other hand, in the event that the IP address of interest is not stored in the example market information database 106 (block 602) or the time/date threshold is exceeded (block 604), then the example hostname resolver 212 performs a reverse DNS lookup (also referred to as a reverse-resolve) using the IP address of interest to retrieve an associated hostname (block 608). An example response to a reverse DNS lookup using the IP address of interest 68.87.148.146 is "ge-0-1-ubr01.warren.ma.boston.comcast.net." Also note that an example response to an ARIN database Whois query using this same IP address of interest to identify the organization name is "Comcast Cable Communications, Inc." Accordingly, both the reverse DNS lookup and the registry database lookup identify the same end-user entity.

However, in some circumstances the organization name from the ARIN query and the reverse DNS will not match, such as when the example IP address of interest is 64.236.16.20. In this example, the ARIN query identifies the organization responsible for registering the IP address as "AOL Transit Data Network." On the other hand, a reverse DNS using the same IP address of interest reveals "www2.cnn.com." To resolve such a disparity and determine the true end user associated with the IP address of interest, the example hostname resolver 212 compares reverse DNS labels with labels stored in the example market information database 106 (block 610), as described in further detail in connection with FIG. 7.

Figure 7:
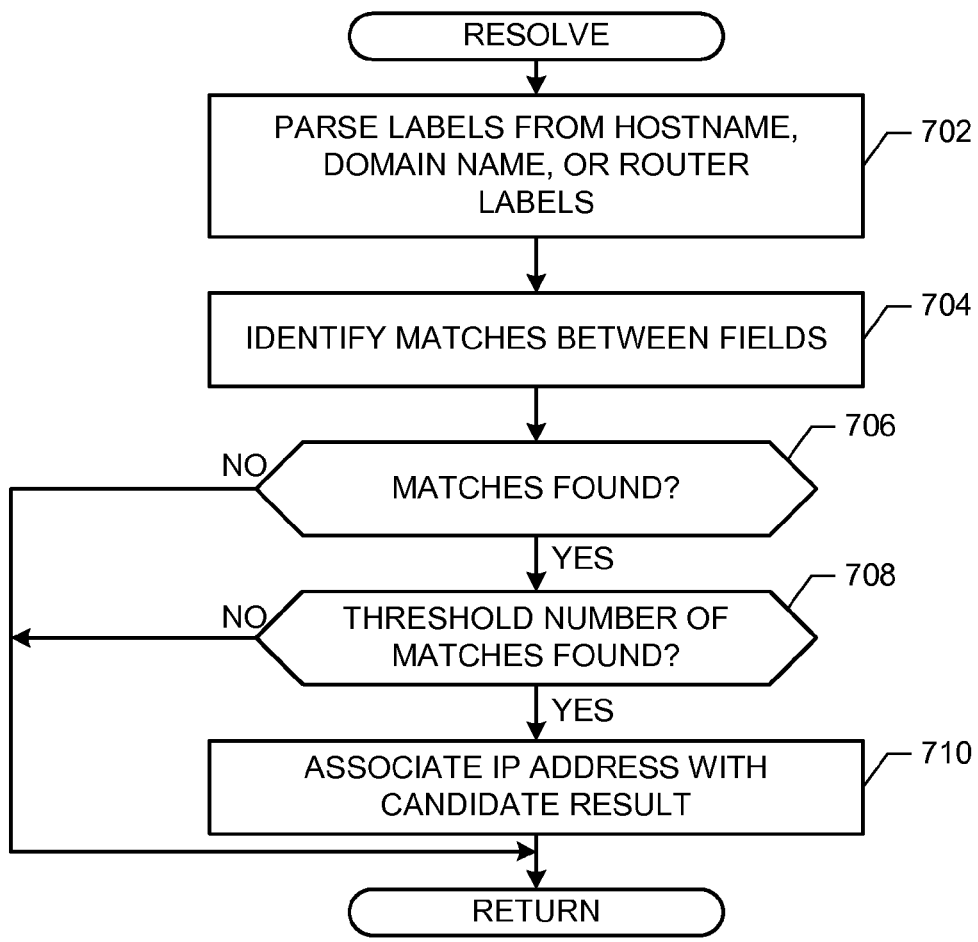

In the illustrated example of FIG. 7, the example hostname resolver 212 parses and places received hostname, domain name, and/or router labels in separate fields (block 702) and identifies whether the labels satisfy a match of known residential ISPs stored as resolution keywords in the resolution keyword table 107 of the example market information database 106 (block 704). The one or more keywords in the example resolution keyword table 107 may include, but are not limited to, letters, words, numbers and/or one or more alphanumeric representations that are indicative of an ISP, an organization, and/or a location. In other words, the example hostname resolver 212 applies one or more rules to identify a valid ISP associated with a combination of labels parsed from a received hostname. Continuing with the example above, the hostname "ge-0-1-ubr01.warren.ma.boston.comcast.net" may be analyzed by the hostname resolver 212 so that the labels "ma," "boston," and "comcast" are parsed-out for comparison purposes. In this example, the hostname resolver 212 includes a rule in which these three labels, when all identified within a single received hostname, result in identification of Comcast® as the ultimate end-user ISP.

However, assuming that the returned hostname was, instead, "ge-0-1-ubr01.warren.ma.comcast.net," then the example rule that requires at least three specific labels for proper identification of Comcast® would not be satisfied. Despite the fact that one of the labels includes "comcast," the possibility exists that Comcast® redistributes (e.g., a reseller) the IP address to a separate ISP. Accordingly, Comcast® and/or its residential customers would not be the ultimate end-user in this example, thus the IP address of interest cannot be properly associated with a conclusive end-user. Continuing with the example process 610 of FIG. 7, the example hostname resolver 212 determines if any label matches are found in the market information database 106 (block 706) and, if so, whether the required number of threshold label matches have been detected (block 708). If the required number of threshold label matches have been met (block 708), then the IP address of interest is associated with the ISP identified in the market information database 106 and/or a candidate result (block 710).

Returning to FIG. 6, if the hostname ownership is not resolved after one or more queries to the market information database 106 as described in connection with FIG. 7 (block 612), then the received hostname from the reverse DNS is flagged for manual follow-up (block 614). The manual follow-up may include, but is not limited to one or more users investigating new, alternate, and/or otherwise unrecognized label keywords to determine an associated ISP organization name and/or corresponding location. Such newly discovered information may further be appended to the example market information database 106 and/or resolution keywords 107 so that future/subsequent circumstances allow immediate resolution when those label keywords are encountered. This circumstance may arise in the event a new ISP enters the market having hostname labels not previously identified during one or more tests of IP addresses. As a result, the market information database 106 described herein continues to become more complete the longer it is used with the methods and apparatus described herein to measure broadband market statistics.

If, on the other hand, the received hostname is resolved (block 612), then the example hostname resolver 212 initiates a multi-location trace-route (block 616) to confirm a common last hop router hostname (block 618). For example, if a first trace-route for the IP address of interest 68.87.148.146 originates in San Francisco (e.g., initiating router hostname "bdrrtr-a.22.c4.sf2.telephia.com"), a second trace-route for the same IP address originates in Dallas (e.g., initiating router hostname "tbr1.dlstx.ip.att.net"), and a third trace-route for the same IP address of interest originates in Lindbergh (e.g., initiating router hostname "host-criterion-83-225.customer-.ntelos.net") all identify a last hop router hostname "ge-0-1-ubr01.warren.ma.boston.comcast.net," then the labels indicative of location are extracted to identify the corresponding city and/or state in which the IP address of interest is located (block 620). In this example, the label cues "boston" and "ma" identify the city of Boston in the state of Massachusetts. However, in the event that there is no indicator of location in the hostname, then any information in the example market information database 106 will be used.

If, instead, all three trace-routes do not identify a common last hop router hostname (block 618), then the example hostname resolver 212 compares each returned hostname for a match in the example market information database 106 and resolves a corresponding location if a match is found (block 622), otherwise the IP address of interest is flagged for follow-up (block 624).

Figure 8:
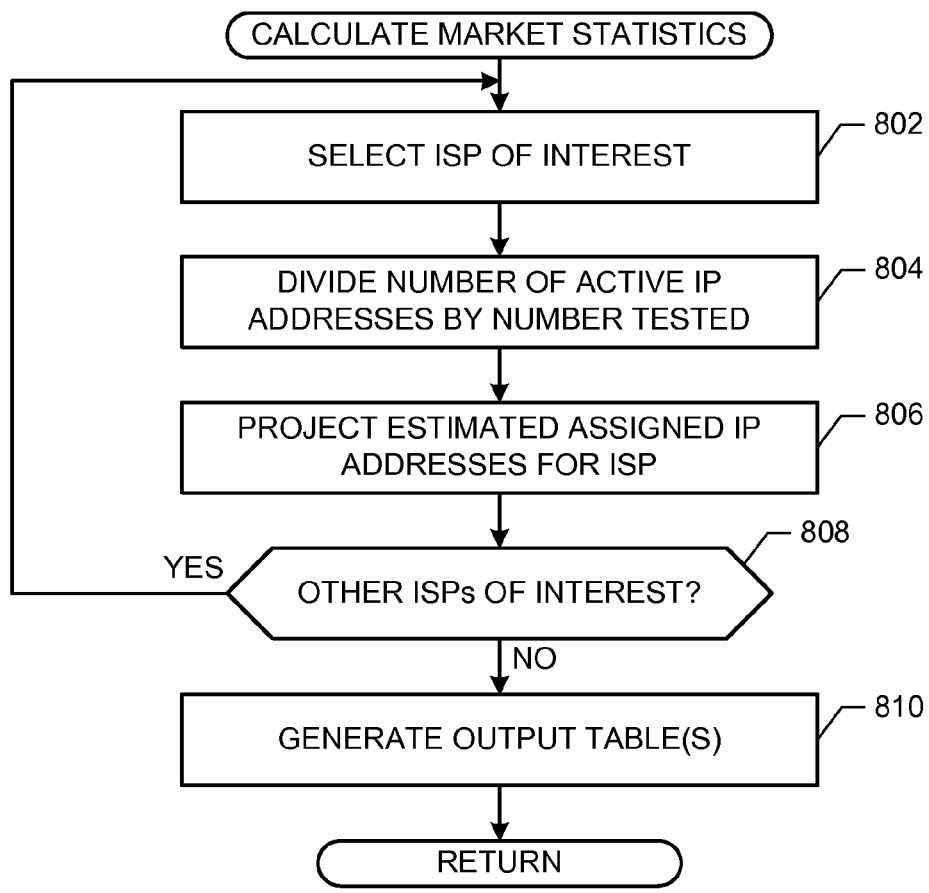

Returning to the illustrated example process 300 of FIG. 3, if the test manager 202 does not have any additional IP addresses of interest to test (block 322), then the test manager 202 calculates one or more broadband market statistics (block 324) such as, for example, market share. Turning to FIG. 8, the example test manager 202 selects an ISP of interest for which broadband market statistics are desired (block 802). Data returned from the one or more iterative tests of IP addresses is stored in the market information database 106, and for each ISP of interest the number of detected active IP addresses is divided by the total number of IP addresses tested to yield a percentage of active IP addresses for the given time period (block 804). In the event that the total number of IP addresses tested satisfies a threshold value indicative of a statistically significant sample size, the example test manager 202 calculates one or more projection estimates for the ISP of interest in the given market area (e.g., the first market area 118, the second market area 120, etc.) (block 806). For example, if a number of assigned IP addresses is found to be 325 out of 500 IP addresses tested, then a factor of 0.65 is calculated as factor indicative of active IP addresses. Additionally, if the ISP of interest is believed to control a quantity of, for example, 10,000 IP addresses (e.g., as determined from one or more registry databases, such as the ARIN database), then a total number of active IP addresses may be calculated/projected as 6,500 (e.g., 325÷0.05, or 0.65×10,000). If the user desires to calculate one or more broadband market statistics for alternate ISPs (block 808), then control returns to block 802, otherwise one or more output tables may be generated for the user (block 810), such as the example output tables 900 and/or 950 shown in FIGS. 9A and 9B.

Figure 9A:
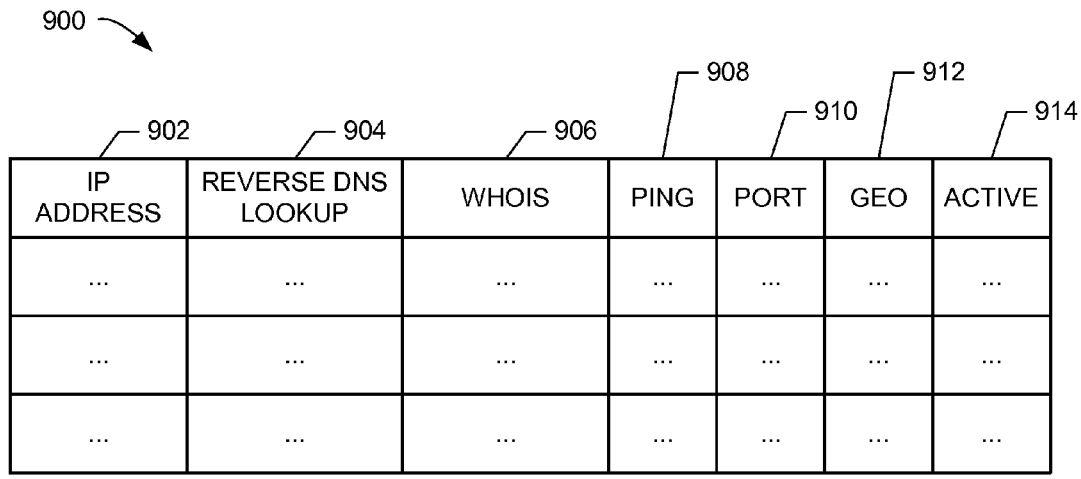
FIGS. 9A and 9B are example data charts generated by the example systems and apparatus of FIGS. 1 and 2, and/or the example processes of FIGS. 3-8.

The example data output table 900 of FIG. 9A includes an IP address column 902, a reverse DNS lookup column 904 to identify a hostname corresponding to the IP address, a Whois column 906 to identify a corresponding registrant name associated with the IP address, a ping column 908 to identify whether or not a ping operation was successful, and a port column 910 to identify whether or not one or more port scanning operations were successful. Additionally, the example table 900 of FIG. 9A includes a geography column 912 to identify the location of the IP address, and an active column 914 to identify whether the IP address of column 902 is active or inactive.

Figure 9B:
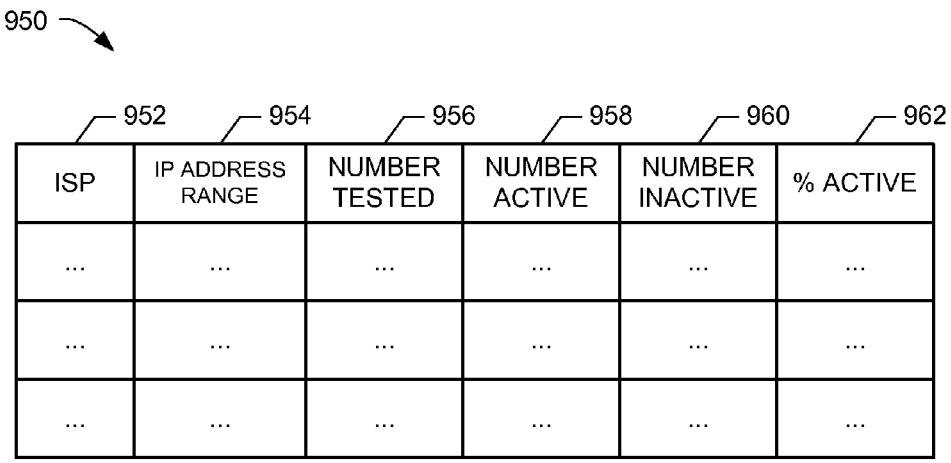

The example data output table 950 of FIG. 9B includes an ISP column 952, an IP address range column 954 to identify which groups of IP addresses (e.g., one or more grouped ranges of IP addresses) the ISP is responsible for, a number of IP addresses tested column 956 to identify the total number of IP addresses tested from the pool of IP addresses in column 954, and a number of active IP addresses column 958. The example data output table 950 also includes a number of inactive IP addresses column 960 and a corresponding percentage of active IP addresses based on the total number of IP addresses tested column 962. While FIGS. 9A and 9B illustrate two example data output tables that may be generated and/or calculated by the example market share evaluator 102, the methods and apparatus described herein are not limited thereto. Any other data output arrangement may be generated by the market share evaluator 102 to accommodate for varying needs of the user(s) such as, but not limited to, ranked data tables to illustrate ISPs having the largest or smallest market share for a city, a state, a region, and/or data tables to illustrate a rate of change in subscribers from one time period to another time period. Additionally, the example data tables 900 and 950 calculated by the example market share evaluator 102 may also identify one or more trends related to subscriber increases, subscriber decreases, and/or one or more effects in response to advertising and/or promotional efforts. For example, the ISP using the methods and apparatus described herein may establish a baseline broadband subscriber share and/or a rate of new subscribers for the ISP and/or competitors of the ISP prior to initiating one or more advertising and/or promotional campaigns. During such advertising and/or promotional campaigns, the ISP may continue to employ the methods and apparatus described herein to determine the effect of such advertising efforts (e.g., a threshold gain in the percentage of subscribers, an increase in the rate of new subscribers, etc.).

Figure 10:
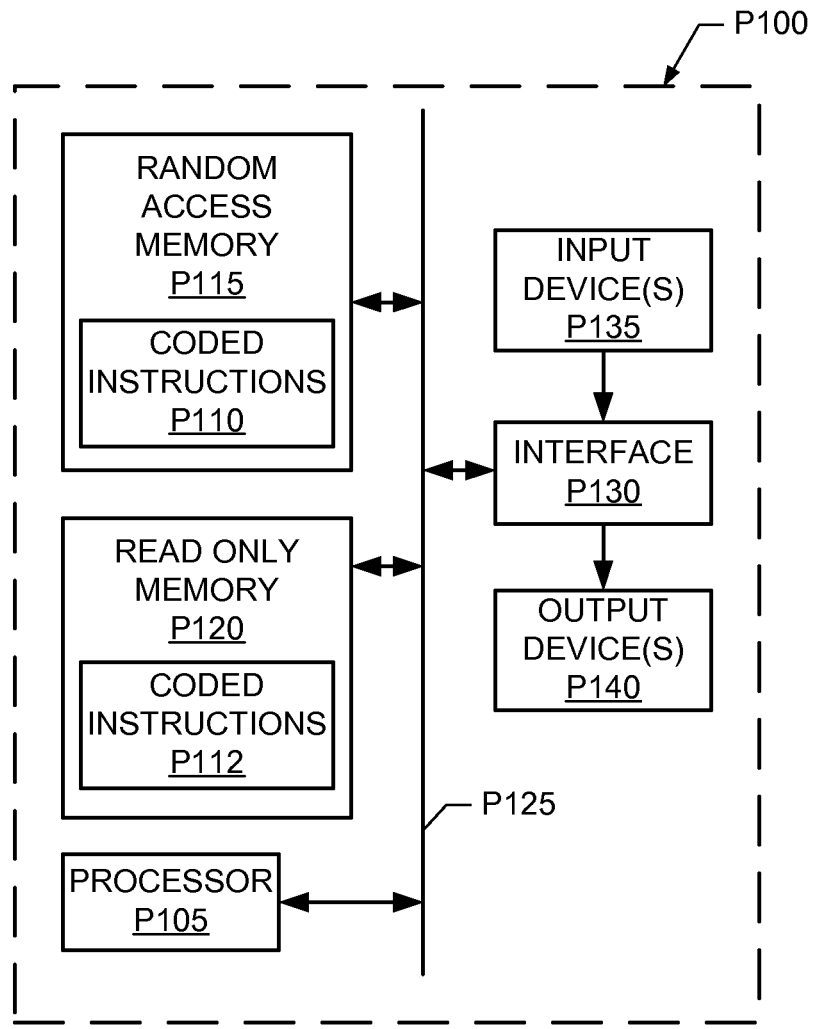
FIG. 10 is a block diagram of an example processor system that may be used to execute the example processes of FIGS. 3-8 to implement the example systems, apparatus, and/or methods described herein.

FIG. 10 is a schematic diagram of an example processor platform P100 that may be used and/or programmed to implement any or all of the example market share evaluator 102, the example test manager 202, the example IP address aggregator 204, the example ping manager 206, the example port scan manager 208, the example registry manager 210, the example hostname resolver 212, the example network interface 214, and/or the example panelist updater 216 of FIGS. 1 and 2. For example, the processor platform P100 can be implemented by one or more general-purpose processors, processor cores, microcontrollers, etc.

The processor platform P100 of the example of FIG. 10 includes at least one general-purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 3-8 to implement the example methods and apparatus described herein.

The processor P105 is in communication with the main memory (including a ROM P120 and/or the RAM P115) via a bus P125. The RAM P115 may be implemented by dynamic random access memory (DRAM), synchronous dynamic random access memory (SDRAM), and/or any other type of RAM device, and ROM may be implemented by flash memory and/or any other desired type of memory device. Access to the memory P115 and the memory P120 may be controlled by a memory controller (not shown). The example memory P115 may be used to implement the example market information database 106 of FIG. 1.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to classify an Internet protocol (IP) address owner, comprising:
   identifying first organization information associated with an IP address via a registration database;
   invoking a reverse resolve operation with the IP address to obtain a first domain name;
   parsing the first domain name to extract domain labels having second organization information; and
   in response to identifying a discrepancy between the first organization information and the second organization information, classifying the second organization as an Internet Service Provider (ISP) reseller.

2. A method as defined in claim 1, further including comparing the domain labels with geographic keywords to identify a location of the IP address.

3. A method as defined in claim 2, wherein the geographic keywords include at least one of a country abbreviation, a state abbreviation, or a city abbreviation.

4. A method as defined in claim 2, further including verifying the accuracy of the geographic keywords by comparing the geographic keywords with a second domain name associated with a panelist IP address.

5. A method as defined in claim 1, further including comparing a count of the domain labels that match the second organization information to a threshold.

6. A method as defined in claim 5, further including associating the IP address with the ISP reseller based on the comparison when the threshold is met.

7. A method as defined in claim 1, wherein first and second organization information includes at least one of an organization name, a country name, a state name, or a city name.

8. A method as defined in claim 1, wherein the registration database includes at least one of an American Registry for Internet Numbers database, an Internet Corporation for Assigned Names and Number database, an Asia Pacific Network Information Centre database, or a Latin American and Caribbean IP Address Regional Registry database.

9. A method as defined in claim 1, wherein invoking the reverse resolve operation includes a reverse domain name server lookup.

10. An apparatus to classify an Internet protocol (IP) address owner, comprising:
    a registry manager to identify first organization information associated with an IP address via a registration database; and
    a hostname resolver to invoke a reverse resolve operation with the IP address to obtain a first domain name, to parse the first domain name to extract domain labels having second organization information, and to classify the second organization information as an Internet Service Provider reseller in response to identifying a discrepancy between the first organization information and the second organization information.

11. An apparatus as defined in claim 10, wherein the hostname resolver is to compare the domain labels with geographic keywords to identify a location of the IP address.

12. An apparatus as defined in claim 11, wherein the hostname resolver is to verify the accuracy of the geographic keywords by comparing the geographic keywords with a second domain name associated with a panelist IP address.

13. An apparatus as defined in claim 10, wherein the hostname resolver is to compare a count of the domain labels that match the second organization information to a threshold.

14. An apparatus as defined in claim 13, wherein the hostname resolver is to associate the IP address with the ISP reseller when the threshold is met.

15. A tangible machine readable storage device or storage disk comprising instructions stored thereon that, when executed, cause a machine to, at least:
   identify first organization information associated with an IP address via a registration database;
   invoke a reverse resolve operation with the IP address to obtain a first domain name;
   parse the first domain name to extract domain labels having second organization information; and
   in response to identifying a discrepancy between the first organization information and the second organization information, classifying the second organization as an Internet Service Provider (ISP) reseller.

16. A machine readable storage device or storage disk as defined in claim 15, wherein the instructions, when executed, cause the machine to compare the domain labels with geographic keywords to identify a location of the IP address.

17. A machine readable storage device or storage disk as defined in claim 16, wherein the instructions, when executed, cause the machine to verify the accuracy of the geographic keywords by comparing the geographic keywords with a second domain name associated with a panelist IP address.

18. A machine readable storage device or storage disk as defined in claim 15, wherein the instructions, when executed, cause the machine to compare a count of the domain labels that match the second organization information to a threshold.

19. A machine readable storage device or storage disk as defined in claim 18, wherein the instructions, when executed, cause the machine to associate the IP address with the ISP reseller when the threshold count is met.

20. A machine readable storage device or storage disk as defined in claim 15, wherein the instructions, when executed, cause the machine to invoke the reverse resolve operation via a reverse domain name server lookup.

21. A method as defined in claim 1, wherein the ISP reseller sources services from a first organization associated with the first organization information.

22. An apparatus as defined in claim 10, wherein the ISP reseller sources services from a first organization associated with the first organization information.

* * * * *